United States Patent [19]

Asselin et al.

[11] Patent Number: 4,863,354
[45] Date of Patent: Sep. 5, 1989

[54] NOSE COWL FOR A TURBOJET ENGINE SHAFT

[75] Inventors: Jean-Claude Asselin, Moret Sur Loing; Pierre A. Glowacki, Fontaine Le Port, both of France

[73] Assignee: Societe Nationale d'Etude et de Construction de Moteurs d'Aviation (SNECMA), Paris, France

[21] Appl. No.: 253,760

[22] Filed: Oct. 5, 1988

[30] Foreign Application Priority Data

Oct. 7, 1987 [FR] France .................. 87 13826

[51] Int. Cl.⁴ .............................. F04D 29/58
[52] U.S. Cl. ................. 416/245 R; 415/175; 60/39.093
[58] Field of Search ........... 415/117, 177, 182, 219 R; 416/245 R, 245 A, 146, 94; 60/39.093

[56] References Cited

U.S. PATENT DOCUMENTS

| | | | |
|---|---|---|---|
| 3,420,311 | 1/1969 | Davies et al. | 416/245 X |
| 3,925,979 | 12/1975 | Ziegler | 60/39.093 |
| 4,546,604 | 10/1985 | Moore et al. | 416/95 |
| 4,755,103 | 7/1988 | Streifinger | 415/175 X |

FOREIGN PATENT DOCUMENTS

| | | | |
|---|---|---|---|
| 557120 | 7/1942 | United Kingdom | 416/245 |
| 1357712 | 6/1974 | United Kingdom . | |

Primary Examiner—Robert E. Garrett
Assistant Examiner—Joseph M. Pitko
Attorney, Agent, or Firm—Bacon & Thomas

[57] ABSTRACT

A nose cowl or spinner is provided for a fixed, non-rotatable central hub of a turbojet engine having assembly means that facilitate the attachment and detachment of the nose cowl to the central hub, and provides a readily visible indication of whether or not the nose cowl has been properly assembled to the hub. The nose cowl has a smooth outer surface to provide undisturbed air flow into the turbojet engine compressor and defines means to circulate heated air to prevent icing of the external surface. An inner cowl member is attached to a bearing cover of the central hub in a non-rotatable manner, an outer cowl member is axially locked to the central hub so as to be concentrically arranged about the inner cowl member, and a locking device is used to lock the inner and outer cowl members together to prevent inadvertent rotation of the outer cowl member.

25 Claims, 3 Drawing Sheets

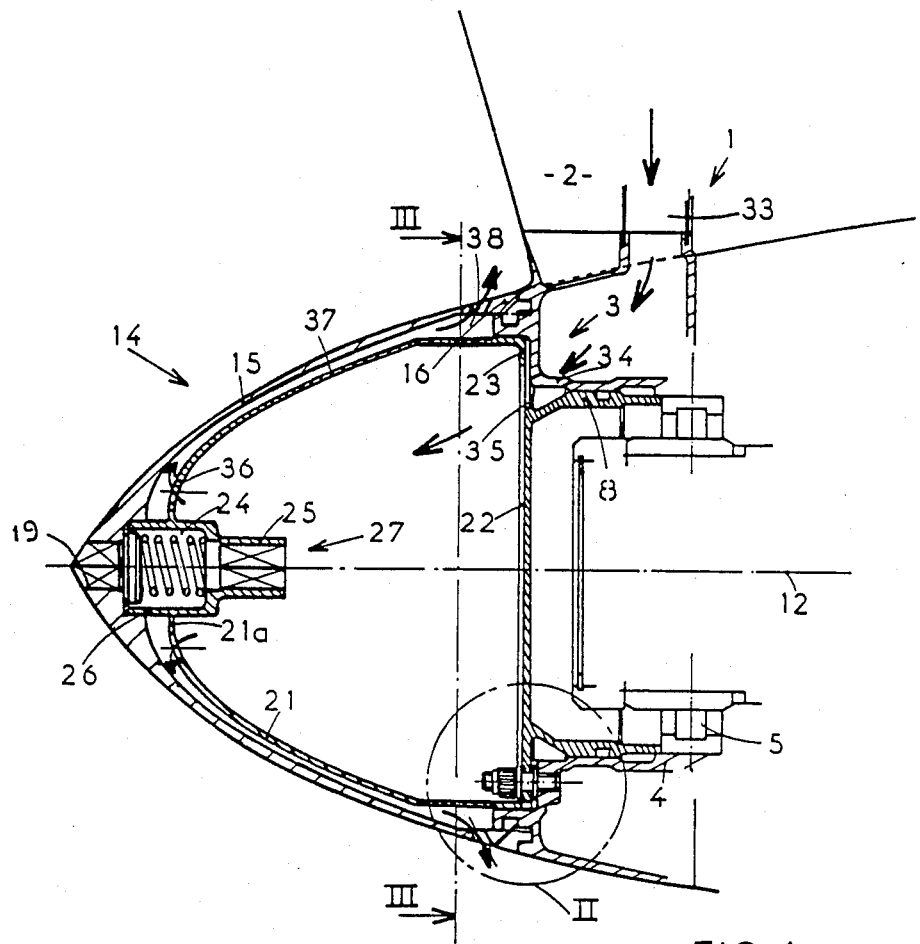
FIG:1
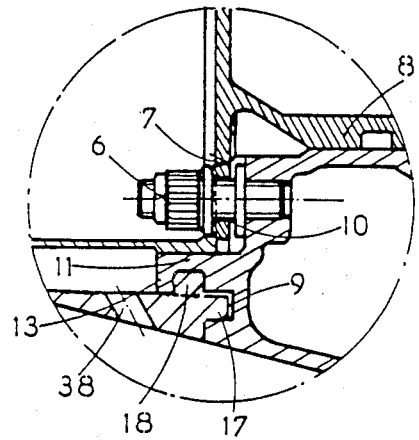
FIG:2

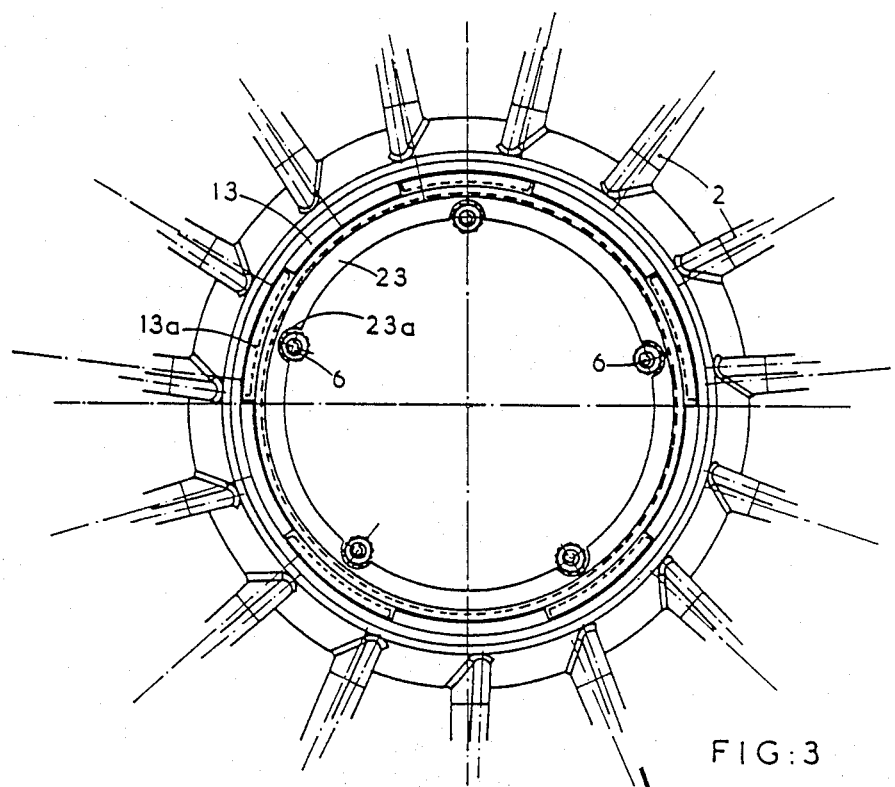
FIG:3
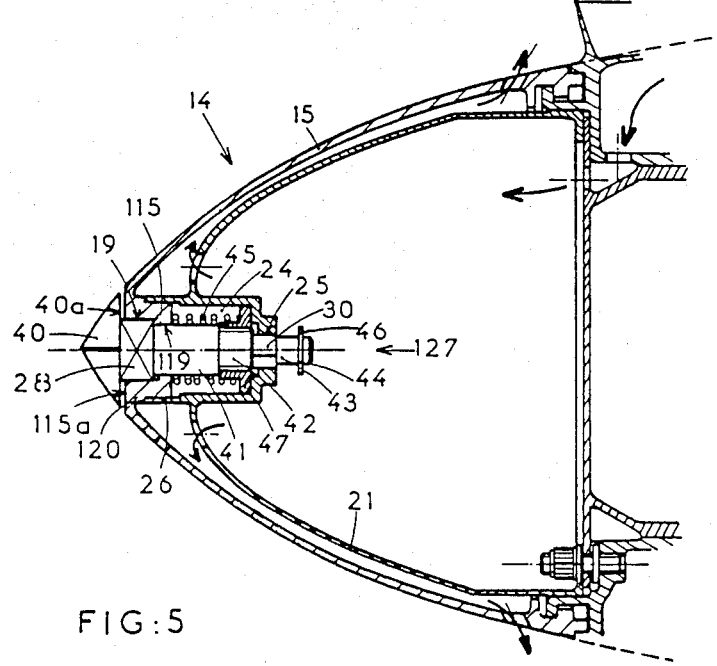
FIG:5

NOSE COWL FOR A TURBOJET ENGINE SHAFT

BACKGROUND OF THE INVENTION

The present invention relates to a nose cowl or spinner for a non-rotating shaft of a turbojet engine.

Turbojet engines typically have a central hub or shaft to support the various rotating and non-rotating components of the engine. A nose cowl or spinner is usually affixed to the forwardmost portion of this central hub or shaft to improve the aerodynamic efficiency of the air passing over the shaft and to efficiently direct the air into the turbojet engine with minimal perturbations. The nose cowl or spinner is symmetrical about the central longitudinal axis of the shaft and may define a curved or a generally pointed tip.

Such nose cowls or spinners may be attached to a rotating shaft of the turbojet engine so as to rotate with the shaft. An example of this type of cowl can be found in French Pat. No. 2,168,938 wherein a two-part cowl, joined together via a central, axial bolt, is fastened to the rotating shaft. Means are provided to direct warm or heated air into the space between the two cowl members so as to prevent ice from forming on the exterior surface of the cowl.

U.S. Pat. No. 4,405,208 to Surdi discloses a device for locking the turbine blades onto a fan wheel and also to attach a cowl thereto. The single piece cowl is adjoined to the rotating fan wheel via a bolt, which also assists in mounting the blades to the fan wheel.

U.S. Pat. No. 3,990,814 to Leone describes a spinner or nose cowl having a three-piece construction. The inner mounting member is attached to the fan hub and a frusto-conically shaped body member is attached to an upstream portion of this mounting member via bolts or the like. A nose piece or dome cap is attached to the forward ends of these elements by bolts or the like.

It is also known to attach a nose cowl or spinner to a stationary central hub or shaft of the turbojet engine as in French Pat. No. 2,253,922. The single piece nose cowl is attached to the central hub by a plurality of bolts or screws.

In the typical known structures, the outer surface of the nose cowl or spinner must define one or more access openings to allow access to the bolts or screws which attach it to the central hub or shaft. The presence of these indentations or openings formed in the external surface of the cowl create disturbances in the air flowing over the cowl and, hence, create perturbations in the air flowing into the turbojet engine. These perturbations affect the intake air flow and serve to decrease the efficiency of the turbojet engine compressor.

Solutions to this problem of the prior art devices have heretofore involved complex and inherently unreliable fastening methods to attach the nose cowl or spinner to the central hub. The solution result in an unduly complex attachment and detachment procedure, and do not provide a readily visible indication as to whether or not the nose cowl or spinner has been properly assembled to the central hub.

SUMMARY OF THE INVENTION

The present invention provides a nose cowl or spinner for a fixed, non-rotatable central hub or shaft of a turbojet engine having assembly means that readily facilitate the attachment and detachment of the nose cowl to the central hub, and provides a readily visible indication of whether or not the nose cowl has been properly assembled to the hub. Additionally, the nose cowl according to the invention has a smooth outer surface to provide undisturbed air flow into the turbojet engine compressor. The nose cowl according to the invention is easily and rapidly assembled to the central hub in a absolutely reliable manner and defines means to circulate heated air to prevent icing of the external surface.

The nose cowl according to the invention has an inner cowl member attached to a bearing cover of the central hub or shaft in a non-rotatable manner, an outer cowl member axially locked to the central hub so as to be concentrally arranged about the inner cowl member, and a locking device to lock the inner and outer cowl members together to prevent inadvertent rotation of the outer cowl member.

The inner cowl member has a generally curved, frusto-conical shape symmetrical about the central axis of the central hub, with a generally radially inwardly extending flange defining one or more notches to engage fasteners attaching the bearing cover to the central hub. The engagement of the notches with the fasteners prevents rotation of the inner cowl member with respect to the central hub.

The central hub and the outer cowl member have mutually engagable bayonet joint flanges extending radially therefrom such that the outer cowl member, which also has a generally curved, frusto-conical configuration, may be placed over the inner cowl member and rotated with respect to the central hub so as to axially lock it to the central hub.

The inner cowl member and the outer cowl member both define passageways having non-circular cross-sections. A locking device, having complementary shaped locking portions engages both of the passageways so as to prevent relative rotation of the inner and outer cowl members, thereby locking them to the central hub.

The locking member has a spring to urge the locking portions into their respective passageways in the inner and outer cowl member, which spring may be compressed or displaced during the assembly or disassembly process to enable the rotation of the outer cowl member so as to either engage or disengage the bayonet locking flanges from those of the central hub.

A portion of the locking device is visible from the exterior of the outer cowl member to provide a rapid visual indication as to whether or not the device has been properly assembled and locked.

When locked together, the inner and outer cowl members define a space between them. Warm or heated air drawn from the turbojet engine is directed into the interior of the inner cowl member and passes through air openings formed in the inner cowl member into the space so as to prevent icing of the outer cowl member. The air exits from this space through openings defined in the rear portion of the outer cowl member so as to pass back into the turbojet engine intake. The absence of any screws or bolt heads, or openings for access to these elements enables the outer cowl member to be formed with a smooth exterior surface so as to provide an efficient air flow into the turbojet engine intake.

The invention provides a simple and inherently reliable system for attaching the nose cowl to the central hub and one which provides a readily visible indication as to whether or not the components have been properly assembled.

BRIEF DESCRIPTION OF THE DRAWINGS

FIG. 1 is a longitudinal cross-sectional view showing the nose cowl affixed to a turbojet engine hub according to the invention.

FIG. 2 is a partial, enlarged detailed view of the area indicated by II in FIG. 1.

FIG. 3 is a partial, front view taken in the direction of arrows III in FIG. 1.

FIG. 5 is a longitudinal cross-sectional view showing an alternative embodiment of the nose cowl according to the present invention.

DETAILED DESCRIPTION OF THE PREFERRED EMBODIMENTS

Figure 4:
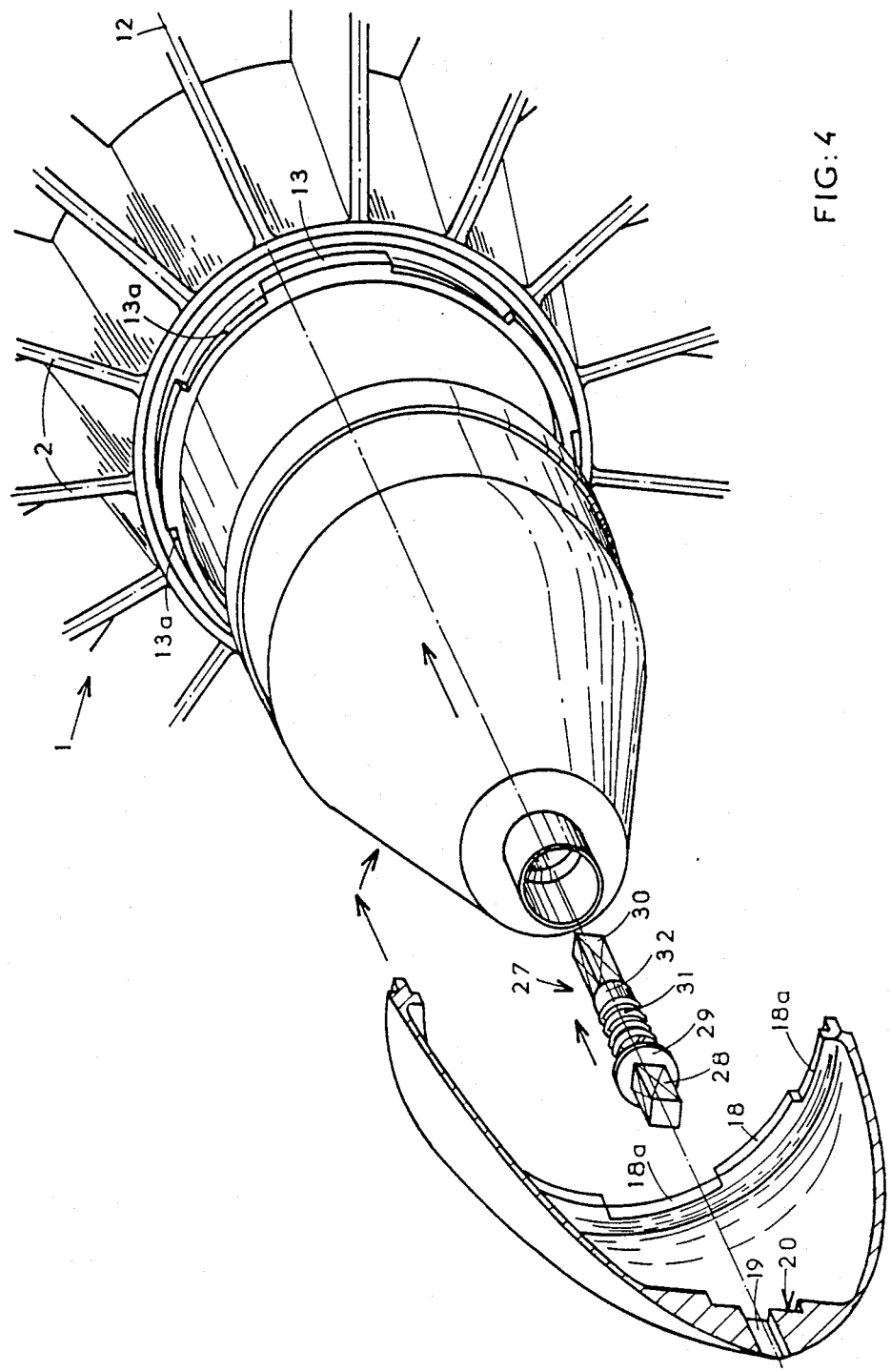
FIG. 4 is a partial, exploded, perspective view of the nose cowl according to the invention.

The front end of a turbojet engine hub or shaft incorporating the nose cowl or spinner according to a first embodiment of the invention is shown in FIGS. 1-4. The air intake casing 1 has a plurality of radially extending arms 2 fixedly joined to and extending from non-rotating central hub 3. A bearing case 4 is formed on the central hub 3 and covers a front bearing of the turbojet engine indicated schematically at 5 in FIG. 1. A detailed view of the attachment of bearing cover 8 to hub 3 is shown in FIG. 2 wherein it is seen that bolts 6 extend through the bearing cover 8 and into the front side 7 of the bearing case 4. The central hub 3 defines an axially opening annular groove 9 located radially outwardly of the holes 10 through which bolts 6 pass. A flange 11 axially extends from the front portion of the central hub and has a flange 13 extending radially outwardly from its distal end portion. Flange 13 defines a plurality of recesses 13a (shown in FIG. 3) which form half of a bayonet-type joint for attaching the outer cowl member thereto.

The non-rotating nose cowl 14 comprises an outer cowl member 15 and an inner cowl member 21. Outer cowl member 15 is symmetrical about longitudinal axis 12 and generally has a frusto-conical shape which may have curved sides. The base 16 of the outer cowl member 15 has an axially extending flange 17 extending therefrom which is adapted to engage annular groove 9 formed in the central hub. Adjacent to this downstream end portion, a radially inwardly extending flange 18 defines a plurality of recesses 18a so as to constitute the second half of the bayonet-type joint. The recesses 18a accommodate portions of flange 13, while recesses 13a accommodate flange portions 18 to enable the outer cowl member 15 to be axially placed onto the front of the central hub such that flange 17 engages groove 9. Thereafter, rotation of the outer cowl member 15 with respect to the central hub aligns flanges 13 and 18 so as to prevent any axial movement between the outer cowl member 15 and the central hub.

Outer cowl member 15 defines a central passageway 19 generally coincident with the longitudinal axis 12 which has a non-circular, preferably polygonal, shaped cross-section. Although this opening is illustrated as having a square cross section, it is to be understood that other non-circular shapes may be utilized without exceeding the scope of this invention. A cylindrical shoulder 20 is formed on the interior surface of outer cowl member 15 having a generally circular cross-sectional configuration.

The inner cowl member 21 also is symmetrical about axis 12 and also assumes a generally frusto-conical configuration. While the outer cowl member may be fabricated from a lightweight material, such as aluminum or a composite plastics material, inner cowl member 21 is preferably made of a high strength material, such as steel. The base 22 of inner cowl member 21 has a radially inwardly extending annular flange 23 which defines notches 23a. The inner cowl member 21 is placed over the end of the bearing cover 8 of the central hub 3 such that one or more of the notches 23a engage the heads of bolts 6. This engagement of the notches with the bolt heads prevents any rotation of the inner cowl member 21 with respect to the central hub. The outer surface of the base 22 of the inner cowl member 21 slidably bears against the inner surface of flange 11 extending from the front of the central hub.

Inner cowl member 21 has a housing 24 extending substantially axially along its axis of symmetry with a generally circular cross section. The dimensions of the housing 24 are such that an end portion may be slidably received within the circular recess 20 formed in the outer cowl member 15. Housing 24 defines a passageway 25 which also has a non-circular cross-sectional configuration which may be polygonal in shape. Again, although a square shaped cross-section is illustrated, it should be understood that other non-circular shapes may also be utilized. Housing 24 also defines a generally cylindrical passageway 26 and may be joined to the end portion 21a of the inner cowl member 21. The lateral dimension of the generally cylindrical passageway 26 exceeds that of the lateral dimension of passageway 25 and the lateral dimension of the passageway 19 formed in outer cowl member 15.

A lock member 27 interlocks the inner and outer cowl members so as to prevent relative rotation between them. The lock member illustrated in FIGS. 1, 3 and 4 comprises a first locking portion 30 having a non-cylindrical cross-sectional shape complementary to that of the passageway 25; a cylindrical portion 32 having a lateral dimension greater than that of the first locking portion 30; a spring 31 attached to and extending axially from the cylindrical portion 32; a washer element 29 attached to the spring 31; and a second locking portion 28 extending axially from the washer element 29. The cross-sectional shape of locking portion 28 is complementary to that of the passageway 19 such that it may be slidably received therein, but will not rotate with respect to the outer cowl member 15. Similarly, the cross-sectional shape of locking portion 30 is complementary to that of passageway 25 such that it may be slidably received therein, but may not rotate with respect thereto. Spring 31 may be a compression spring which urges locking portions 28 and 30 away from each other.

In order to attach the nose cowl to the front of the central hub, the inner cowl member 21 is axially placed on the front of the central hub such that the notches 23a engage the heads of bolts 6 so as to prevent any relative rotation. The lock member 27 is placed onto the inner cowl member 21 such that locking portion 30 extends into passageway 25 as illustrated in FIG. 1. Outer cowl member 15 is then placed axially over the inner cowl member 21 such that locking portion 28 is received in passageway 19. Outer cowl member 15 is then axially displaced toward the central hub such that flange 17 engages annular groove 9 and such that flanges 18 are displaced axially behind flanges 13. The spring 31 is then axially compressed, using a suitable tool, such that locking portion 28 is axially displaced out of engagement with passageway 19, thereby enabling the outer cowl member 15 to be rotated so as to lock the bayonet-type joints 13 and 18. This rotation may be on the order of approximately 30° in order to fix the bayonet-type joint. The proper position of the outer cowl member 15 will be arrived at when the locking portion 28 is once again aligned with passageway 19 and spring 31 urges these elements into engagement. The distal end of locking portion 28 is adjacent the exterior surface of outer cowl member 15 such that the proper attachment is indicated visually by the appearance of the end of the locking portion in the passageway 19. This completely eliminates any possibility that the nose cowl will be inadvertently improperly assembled.

Disassembly of the device is substantially the opposite of the steps noted above. The locking portion 28 is axially displaced out of engagement with passageway 19, the outer cowl member 15 is rotated so as to disengage the bayonet-type joint. The outer cowl member may then be removed, the locking member 27 removed from the inner cowl member 21 and the inner cowl member 21 axially removed from the central hub.

The central hub 3 of the air intake casing 1 may define passageways 33 which communicate with heated or warmed air taken from other portions of the turbojet engine. This air may pass into the interior of inner cowl member 21 through perforations 34 and 35 formed in the hub 3 and the bearing cover 8, respectively. Openings 36, formed through the wall of inner cowl member 21 allow the air in the interior of the inner cowl member to pass therethrough into the space 37 formed between the inner and outer cowl members. The heated air passing through this space serves to prevent the formation of ice on the exterior surface of the outer cowl member 15. The air may escape from space 37 through openings 38 formed in the base portion of outer cowl member 15 so as to flow back into the air intake of the turbojet engine.

A second embodiment of the locking member 27 is illustrated at 127 in FIG. 5. In this embodiment, the locking portions 28 and 30 are joined by a cylindrical portion 41 and a cylindrical portion 42. The lateral dimension of cylindrical portion 41 is less than that of the locking portion 28, while the lateral dimension of cylindrical portion 42 is less than that of cylindrical portion 41. The lateral dimension of the locking portion 30 is less than the lateral dimension of cylindrical portion 42.

A forward cylindrical portion 26 of housing 24 is slidably received over a cylindrical shoulder 120 formed on portion 115 extending toward the inside of the outer cowl member 15. Cylindrical portion 115 defines the passageway 19 having the non-circular cross section as well as a circular passageway 119 having a lateral dimension slightly less than the non-circular portion 19. A tip 40 extends axially from locking portion 28 and its outer contour may match that of the outer cowl member 15. The base 40a of the tip 40 is axially displaced a small amount from axial end 115a of the outer cowl member 15.

The locking member 127 also comprises a cylindrical portion 43, having a diameter smaller than the lateral dimension of locking portion 30 and extending axially from this locking portion. Cylindrical portion 43 may define a groove 44 in which a retaining ring 46 is attached. The ring 46 extends radially outwardly from the cylindrical portion 43.

The nose cowl according to this embodiment is assembled to the central hub in substantially the same fashion as in the previously described embodiment. The elements are assembled as indicated in FIG. 5 and the inner cowl member 21 is placed against the central hub such that notches 23a engage the heads of bolts 6. At this point, the outer cowl member 15 is axially displaced away from the central hub. Spring 45 interposed between portion 115 and a flanged bushing 47 threadingly attached to cylindrical 42 exerts a force tending to axially separate the inner and outer cowl members. The outer cowl member is then axially displaced such that flange 17 engages annular groove 9 and flange 18 is disposed axially behind flange 13. Spring 45 is then axially compressed by inserting a gripping tool under the base 40a of tip 40 and urging it toward the left as seen in FIG. 5. This disengages the locking portions 28 and 30 from the passageways 19 and 25 and permits the outer cowl member 15 to be rotated with respect to the inner cowl member 21. This enables the bayonet-type joints formed by flanges 13 and 18 to be engaged so as to prevent any further axial movement of outer cowl member 15 with respect to the central hub. Release of the tool from tip 40 allows spring 45 to urge the locking portions back into engagement with their respective passageways so as to prevent any further rotation between the outer cowl member 15 and the inner cowl member 21. Again, a properly formed joint can be visually ascertained by inspection of the position of tip 40 with respect to outer cowl member 15. Disassembly of this embodiment of the invention is substantially the reverse steps.

The non-circular cross-section of the locking portions 28 and 30 may be any polygonal shape so as to prevent rotation in their respective passageways. The number of sides of the polygonal shape may be a sub-multiple of the number of radial arms 2 extending from central hub 3. For instance, in the case where fifteen radial arms are present, locking portions 28 and 30 may have five sides.

The foregoing description is provided for illustrative purposes only and should not be construed as in any way limiting this invention, the scope of which is defined solely by the appended claims.

What is claimed is:

1. A non-rotating nose cowl or spinner for a stationary shaft of a turbojet engine having a central hub, a bearing cover and fastener means fixedly attaching the bearing cover to the central hub, comprising:
   (a) an inner cowl member;
   (b) first attaching means to non-rotatably attach the inner cowl member to bearing cover;
   (c) an outer cowl member;
   (d) second attaching means to attach the outer cowl member to the central hub so as to prevent axial movement therebetween and such that the outer cowl member is substantially concentric with the inner cowl member; and,
   (e) locking means to non-rotatably lock the outer cowl member to the inner cowl member.

2. The nose cowl according to claim 1 wherein the first attaching means comprises a flange extending from the inner cowl member, the flange defining at least one notch to engage at least one of the faster means to thereby prevent relative rotation between the inner cowl member and the bearing cover.

3. The nose cowl according to claim 1 wherein the second attaching means comprises:

(a) a first set of bayonet joint flanges formed on the central hub; and, (b) a second set of corresponding bayonet joint flanges formed on the outer cowl member adapted to engage the first set of bayonet joint flanges to axially lock the outer cowl member onto the central hub.

4. The nose cowl according to claim 1 wherein the locking means comprises:

(a) a first passageway defined by the inner cowl member, the first passageway having a non-circular cross-sectional shape;

(b) a second passageway defined by the outer cowl member, the second passageway having a non-circular cross-sectional shape; and, (c) a locking member comprising;

(i) a first locking portion having a cross-sectional shape corresponding to that of the first passageway and adapted to non-rotatably slide into the first passageway;

(ii) a second locking portion having a cross-sectional shape corresponding to that of the second passageway and adapted to non-rotatably slide into the second passageway; and (iii) spring means non-rotatably interconnecting the first and second locking portions and urging the first and second portions into the first and second passageways, respectively.

5. The nose cowl according to claim 4 wherein the spring means comprises a compression spring located between the first and second locking portions.

6. The nose cowl according to claim 1 wherein the locking means comprises:

(a) a first passageway defined by the inner cowl member, the first passageway having a non-circular cross-sectional shape;

(b) a second passageway defined by the outer cowl member, the second passageway having a non-circular cross-sectional shape; and, (c) a locking member comprising;

(i) a first locking portion having a cross-sectional shape corresponding to that of the first passageway and adapted to non-rotatably slide into the first passageway;

(ii) a seocnd locking portion having a cross-sectional shape corresponding to that of the second passageway and adapted to non-rotatably slide into the second passageway;

(iii) a first cylindrical portion attached to and extending axially from the second locking portion;

(iv) a second cylindrical portion attached to and extending axially between the first cylindrical portion and the first locking portion; and (v) a tip portion attached to the second locking portion and forming a nose tip of the outer cowl member.

7. The nose cowl according to claim 6 wherein the diameter of the first cylindrical portion is less than a lateral dimension of the second locking portion.

8. The nose cowl according to claim 7 wherein the diameter of the second cylindrical portion is less than the diameter of the first cylindrical portion.

9. The nose cowl according to claim 8 wherein a lateral dimension of the first locking portion is less than the diameter of the second cylindrical portion.

10. The nose cowl according to claim 9 further comprising:

(a) a flanged bushing threadingly engaged with the second cylindrical portion; and, (b) sprng means interposed between the flanged bushing and the outer cowl member.

11. The nose cowl according to claim 10 further comprising:

(a) a third cylindrical portion attached to and extending axially from the first locking portion; and, (b) a retaining ring attached to and extending radially from the third cylindrical portion.

12. The nose cowl according to claim 1 further comprising:

(a) an annular groove defined by the central hub; and, (b) an annular flange extending axially from the outer cowl member adapted to engage the annular groove.

13. The nose cowl according to claim 12 wherein the first attaching means comprises a flange extending from the inner cowl member, the flange defining at least one notch to engage at least one of the faster means to thereby prevent relative rotation between the inner cowl member and the bearing cover.

14. The nose cowl according to claim 13 wherein the second attaching means comprises:

(a) a first set of bayonet joint flanges formed on the central hub; and, (b) a second set of corresponding bayonet joint flanges formed on the outer cowl member adapted to engage the first set of bayonet joint flanges to axially lock the outer cowl member onto the central hub.

15. The nose cowl according to claim 14 wherein the locking means comprises:

(a) a first passageway defined by the inner cowl member, the first passageway having a non-circular cross-sectional shape;

(b) a second passageway defined by the outer cowl member, the second passageway having a non-circular cross-sectional shape; and, (c) a locking member comprising;

(i) a first locking portion having a cross-sectional shape corresponding to that of the first passageway and adapted to non-rotatably slide into the first passageway;

(ii) a second locking portion having a cross-sectional shape corresponding to that of the second passageway and adapted to non-rotatably slide into the second passageway; and (ii) spring means non-rotatably interconnecting the first and second locking portions and urging the first and second portions into the first and second passageways, respectively.

16. The nose cowl according to claim 15 wherein the spring means comprises a compression spring located between the first and second locking portions.

17. The nose cowl according to claim 15 wherein the central hub has a number of arms extending radially therefrom and wherein the first and second locking portions comprise elements having a polygonal cross-sectional shape in which the number of sides in the polygon is a multiple of the number of arms.

18. The nose cowl according to claim 14 wherein the locking means comprises:

(a) a first passageway defined by the inner cowl member, the first passageway having a non-circular cross-sectional shape;

(b) a second passageway defined by the outer cowl member, the second passageway having a non-circular cross-sectional shape; and, (c) a locking member comprising;
  (i) a first locking portion having a cross-sectional shape corresponding to that of the first passageway and adapted to non-rotatably slide into the first passageway;
  (ii) a second locking portion having a cross-sectional shape corresponding to that of the second passageway and adapted to non-rotatably slide into the second passageway;
  (iii) a first cylindrical portion attached to and extending axially from the second locking portion;
  (iv) a second cylindrical portion attached to and extending axially between the first cylindrical portion and the first locking portion; and
  (v) a tip portion attached to the second locking portion and forming a nose tip of the outer cowl member.

19. The nose cowl according to claim 18 wherein the diameter of the first cylindrical portion is less than a lateral dimension of the second locking portion.

20. The nose cowl according to claim 19 wherein the diameter of the second cylindrical portion is less than the diameter of the first cylindrical portion.

21. The nose cowl according to claim 20 wherein a lateral dimension of the first locking portion is less than the diameter of the second cylindrical portion.

22. The nose cowl according to claim 21 further comprising:
  (a) a flanged bushing threadingly engaged with the second cylindrical portion; and,
  (b) spring means interposed between the flanged bushing and the outer cowl member.

23. The nose cowl according to claim 22 further comprising:
  (a) a third cylindrical portion attached to and extending axially from the first locking portion; and,
  (b) a retaining ring attached to and extending radially from the third cylindrical portion.

24. The nose cowl according to claim 18 wherein the central hub has a number of arms extending radially, therefrom and wherein the first and second locking portions comprise elements having a polygonal cross-sectional shape in which the number of sides in the polygon is a multiple of the number of arms.

25. The nose cowl according to claim 14 wherein the central hub and the bearing cover define openings allowing air to pass into the interior of the inner cowl member and further comprising:
  (a) at least one first air hole defined by the inner cowl member so as to allow air within the interior of the inner cowl member to flow into a space between the inner and outer cowl members; and,
  (b) at least one second air hole defined by the outer cowl to allow air within a space between the inner and outer cowl member to pass to the exterior of the outer cowl member.

* * * * *

UNITED STATES PATENT AND TRADEMARK OFFICE
CERTIFICATE OF CORRECTION

PATENT NO.  :  4,863,354

DATED       :  September 5, 1989

INVENTOR(S) :  Jean-Claude ASSELIN et al

It is certified that error appears in the above-identified patent and that said Letters Patent is hereby corrected as shown below:

Column 1, line 56, change "solution" to --solutions--.

Column 3, line 54, after "as" insert --to--.
Column 6,
In claim 2, line 64, change "faster" to --fastener--.
Column 7,
In claim 6, line 46, change "seocnd" to --second--.
Column 8,
In claim 13, line 21, change "faster" to --fastener--.

In claim 15, line 51, change "ii)" to --iii)--.

Signed and Sealed this

Ninth Day of July, 1991

*Attest:*

HARRY F. MANBECK, JR.

*Attesting Officer*     *Commissioner of Patents and Trademarks*